US009077178B2

(12) United States Patent
Mullins

(10) Patent No.: US 9,077,178 B2
(45) Date of Patent: Jul. 7, 2015

(54) PROTECTION CIRCUITRY FOR REVERSIBLE CONNECTORS

(71) Applicant: Apple Inc., Cupertino, CA (US)

(72) Inventor: Scott Mullins, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/035,738

(22) Filed: Sep. 24, 2013

(65) Prior Publication Data

US 2014/0162496 A1 Jun. 12, 2014

Related U.S. Application Data

(63) Continuation of application No. 13/191,275, filed on Jul. 26, 2011, now Pat. No. 8,542,472.

(51) Int. Cl.
*H02H 3/00* (2006.01)
*H02H 11/00* (2006.01)
*H01R 24/60* (2011.01)
*H01R 13/64* (2006.01)

(52) U.S. Cl.
CPC .............. *H02H 11/002* (2013.01); *H01R 24/60* (2013.01); *H01R 13/64* (2013.01)

(58) Field of Classification Search
USPC ............... 361/86, 87, 91.1; 307/116, 130
See application file for complete search history.

(56) References Cited

U.S. PATENT DOCUMENTS

| 6,979,205 B2 | 12/2005 | Hoopes et al. |
| 7,094,086 B2 | 8/2006 | Teicher |
| 7,106,566 B2 | 9/2006 | Liu et al. |
| 7,142,402 B1 | 11/2006 | Chaudhry |
| 7,357,668 B2 | 4/2008 | Wan et al. |
| 7,484,963 B2 | 2/2009 | Fenwick et al. |
| 7,497,737 B2 | 3/2009 | Mikolajczak et al. |
| 8,542,472 B2 | 9/2013 | Mullins |

(Continued)

FOREIGN PATENT DOCUMENTS

| CN | 2205606 Y | 8/1995 |
| CN | 101809826 A | 8/2010 |

(Continued)

OTHER PUBLICATIONS

International Search Report and Written Opinion mailed on Apr. 16, 2013 for PCT Patent Application No. PCT/US2012/044542, 10 pages.

(Continued)

*Primary Examiner* — Danny Nguyen
(74) *Attorney, Agent, or Firm* — Kilpatrick Townsend & Stockton LLP

(57) ABSTRACT

An electronic device may include a connector port that accommodates reversible connector plugs. The connector port may include protection circuitry that protects other components in the electronic device from undesired power supply voltages. The protection circuitry may form a first branch and a second branch opposite to the first branch. The protection circuitry may receive control signals from power polarity detection circuitry. The power polarity detection circuitry may detect the presence of power supply voltages at the first branch and the second branch. In response to detecting the presence of a power supply voltage at a given branch, the power polarity detection circuitry may disable a power supply signal path through the opposite branch and enable a power supply signal path through the given branch.

17 Claims, 5 Drawing Sheets

(56) References Cited

U.S. PATENT DOCUMENTS

| | | | |
|---|---|---|---|
| 2006/0024997 A1 | 2/2006 | Teicher | |
| 2007/0243769 A1 | 10/2007 | Atsmon et al. | |
| 2011/0068626 A1* | 3/2011 | Terlizzi et al. | 307/32 |
| 2011/0199123 A1 | 8/2011 | Maher et al. | |
| 2012/0200173 A1 | 8/2012 | Liu et al. | |
| 2013/0115817 A1* | 5/2013 | Terlizzi et al. | 439/620.21 |

FOREIGN PATENT DOCUMENTS

| | | |
|---|---|---|
| DE | 10 2010 050 767 B3 | 2/2012 |
| EP | 2 640 170 A1 | 9/2013 |
| JP | 2008-278619 A | 11/2008 |
| JP | 2008-278619 A2 | 11/2008 |
| KR | 10-2009-0108620 A | 10/2009 |
| TW | 201025751 A | 7/2010 |
| WO | 2008/085863 A2 | 7/2008 |
| WO | 2012/103383 A2 | 8/2012 |
| WO | 2012/103383 A3 | 8/2012 |

OTHER PUBLICATIONS

Non-Final Office Action mailed on Dec. 19, 2012 for U.S. Appl. No. 13/191,275, 7 pages.

Notice of Allowance mailed on May 22, 2013 for U.S. Appl. No. 13/191,275, 9 pages.

Korean Office Action mailed on Oct. 17, 2013 for KR Patent Application No. 10-2012-75792, with English Translation, 9 pages.

Chinese Office Action mailed on Jun. 4, 2014 for Chinese Patent Application No. 201210241338.7, 30 pages.

Taiwan Office Action mailed on Aug. 26, 2014 for TW Patent Application No. 101125190, 7 pages.

* cited by examiner

PROTECTION CIRCUITRY FOR REVERSIBLE CONNECTORS

This application is a continuation of U.S. patent application Ser. No. 13/191,275, filed Jul. 26, 2011, now U.S. Pat. No. 8,542,472, entitled "PROTECTION CIRCUITRY FOR REVERSIBLE CONNECTORS", which is incorporated by reference.

BACKGROUND

This relates generally to electronic devices with connector ports, and more particularly, electronic devices with reversible connector ports that have protection circuitry.

Handheld electronic devices and other portable electronic devices are becoming increasingly popular. Examples of handheld devices include handheld computers, tablet computers, media players, cellular telephones, and hybrid devices that include the functionality of multiple devices of this type.

Electronic devices such as handheld electronic devices often include connector ports. For example, some cellular telephones include 30-pin connector ports. Connector ports such as these may be used as input-output data ports and may receive connector plugs (sometimes referred to herein as mating plugs). Electronic devices may use a connector port to communicate with accessories such as audio speaker systems, computing docks, and power adapters.

Conventional connector ports (e.g., female connectors) are designed to receive connector plugs (e.g., male connectors) with a predetermined orientation. However, this may be inconvenient for users who must determine the appropriate orientation before inserting a conventional connector plug into a corresponding conventional connector.

Therefore, it would be desirable to provide improved connector ports for electronic devices.

SUMMARY

Electronic devices may include connector ports that accommodate reversible connector plugs (sometimes referred to herein as female connectors). Connector ports may be 6-pin connector ports that receive corresponding 6-pin connector plugs (sometimes referred to herein as male connectors or mating plugs). A reversible connector plug may be inserted into a connector port of an electronic device with a first orientation and a second orientation. The connector port may convey and receive data signals and power supply voltages from the connector plug over conductive paths (e.g., contacts). The connector port may provide the data signals and power supply voltages to other components of the electronic device.

The connector port may include associated connector circuitry. The connector circuitry may include protection circuitry that protects the other components from undesired power supply voltages. The protection circuitry may include reverse voltage protection circuitry that protects the components from negative power supply voltages. The protection circuitry may include over-voltage protection circuitry that protects the other components from undesired positive power supply voltages.

The protection circuitry may form a first branch and a second branch opposite to the first branch. The first branch may be coupled to a first power supply path of the connector plug. The second branch may be coupled to a second power supply path of the connector plug.

The protection circuitry may receive control signals from power polarity detection circuitry. The power polarity detection circuitry may detect the presence of power supply voltages at the first branch and the second branch. In response to detecting the presence of a power supply voltage at a given branch, the power polarity detection circuitry may disable a power supply signal path through the opposite branch and enable a power supply signal path through the given branch.

Further features of the present invention, its nature and various advantages will be more apparent from the accompanying drawings and the following detailed description.

DETAILED DESCRIPTION

Embodiments of the present invention relate to electronic devices with connector ports. Electronic devices such as laptop computers, tablet computing devices, cellular telephones, music players, or other portable electronic devices may contain connector ports for communicating with other electronic devices. A given connector port (sometimes referred to herein as a female connector) may receive a connector plug (sometimes referred to herein as a male connector) with a corresponding connector cable that may electrically couple the given connector port to the connector port of another electronic device. Each port may contain conductive paths (e.g., metal traces, conductive pins, or contacts) through which data signals or power supply signals may be transferred between the port and corresponding conductive paths of the connector plug. For example, a tablet computing device may contain a connector port used to communicate with a speaker dock (e.g., by providing audio signals to the speaker dock and receiving power supply signals from the speaker dock). The speaker dock may contain power supply circuitry that provides power supply voltages to the tablet computing device through conductive paths of the connector port, connector cable, and connector plug.

Conventional connector ports receive connector plugs with a predetermined orientation. In other words, the conductive paths of the connector port couple to predetermined pins on a connector plug. For proper operation, each of the 30 conductive paths (e.g., pins or metal contacts) of a conventional 30-pin connector port couple to predetermined locations (e.g., pins or metal contacts) of a conventional 30-pin connector plug (e.g., a male mating connector).

It may be desirable to provide connector ports that accommodate reversible connector plugs (i.e., connector ports that accommodate connector plugs with multiple orientations). Connector ports that accommodate reversible connector plugs may sometimes be referred to herein as reversible connector ports. An illustrative electronic device 10 with a reversible connector port 20A is shown in FIG. 1.

Figure 1:
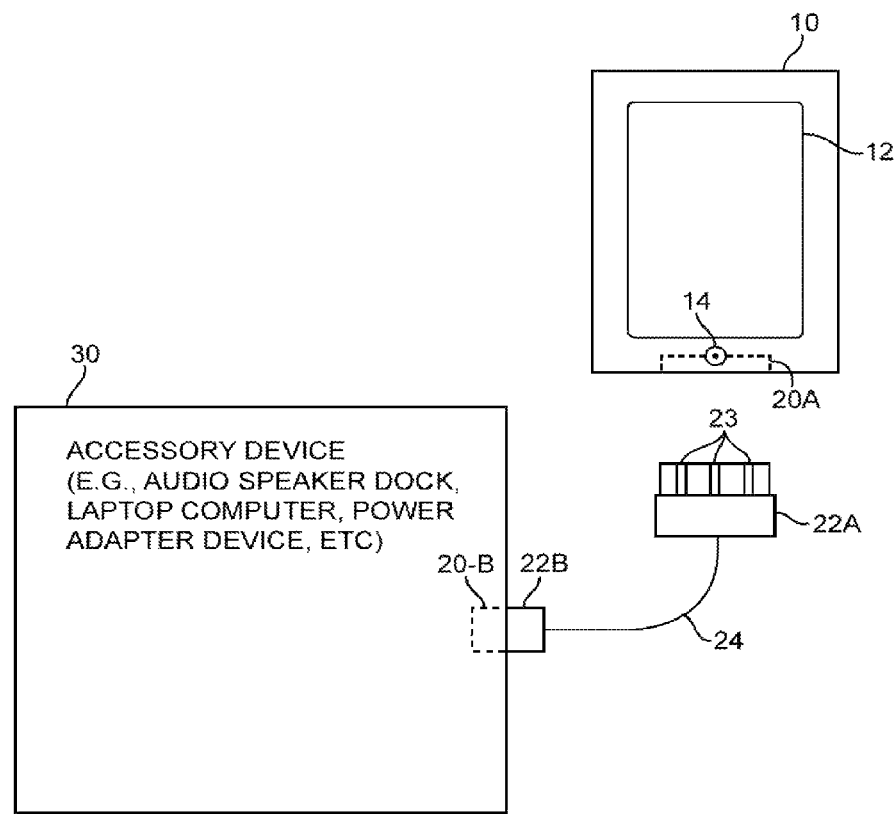
FIG. 1 is a schematic diagram of an illustrative electronic device with a connector port that may be coupled to an accessory device via a mating connector in accordance with an embodiment of the present invention

As shown in FIG. 1, electronic device 10 may include a display 12 and a button 14. Electronic device 10 may include a reversible connector port 20A suitable for receiving a reversible connector plug 22A. Reversible connector port 20A may be a 6-pin connector port (e.g., a 6-pin female connector) suitable for receiving a 6-pin mating connector. Mating connector 22A may have conductive traces 23 (or contacts) for electrically coupling connector plug 22A to connector port 20A (e.g., connector port 20A may contain conductive contacts that electrically couple with conductive contacts 23 when mating connector 22A is inserted into connector port 20A). Connector plug 22A may be coupled to a connector plug 22B via connector cable 24. Connector cable 24 may convey signals from connector plug 22A to connector plug 22B. Connector plug 22B may be an independent connector plug or built in to an accessory device 30. For example, connector plug 22B may be coupled to a connector port 20B or built into accessory device 30. Accessory device 30 may be a device suitable for communicating with or supplying power to electronic device 10. Examples of suitable accessory devices include audio speaker docks, laptop computers, alternating current (AC) power adapters, etc. Accessory device 30 may convey data signals or power supply signals to electronic device 10 via connector plug 22B, connector cable 24, and connector plug 22A.

Figure 2:
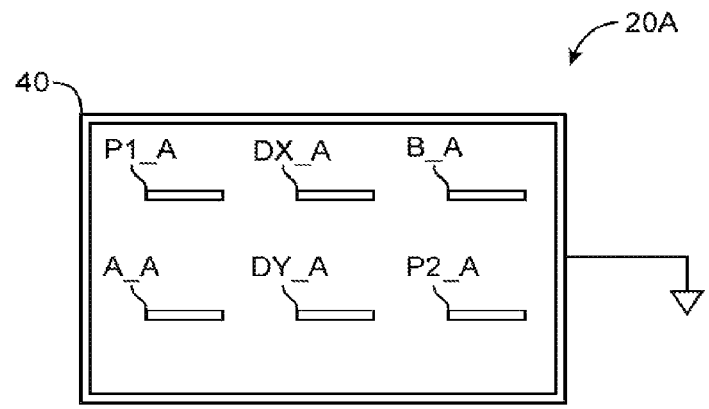
FIG. 2 is a schematic diagram of an illustrative reversible 6-pin connector port in accordance with an embodiment of the present invention.

An illustrative reversible connector port 20A for receiving reversible 6-pin connector plugs is shown in FIG. 2. As shown in FIG. 2, reversible connector port 20A may contain conductive paths P1_A, Dx_A, B_A, A_A, Dy_A, and P2_A. Conductive paths Dx_A, B_A, A_A, and Dy_A may be used to convey signals such as data signals from reversible connector port 20A to a connector plug 22. Conductive paths P1_A and P2_A (sometimes referred to herein as power supply paths) may be used to receive power supply signals from an accessory device 30. For example, an accessory device 30 that is coupled to electronic device 10 via connector plug 22A and reversible connector port 20A may supply a power supply voltage via conductive paths P1_A or P2_A. A ground signal may be provided for connector port 20A through a metal grounding shell 40. Metal grounding shell 40 may provide structural support for receiving a connector plug 22A.

Figure 3A:
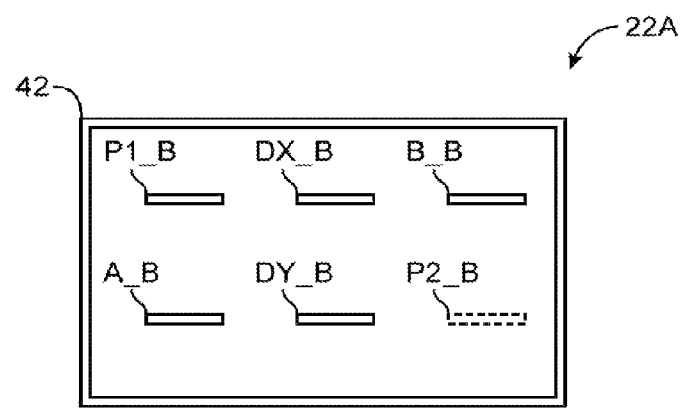
FIG. 3A is a schematic diagram of an illustrative reversible 6-pin mating connector with a first orientation in accordance with an embodiment of the present invention.
Figure 3B:
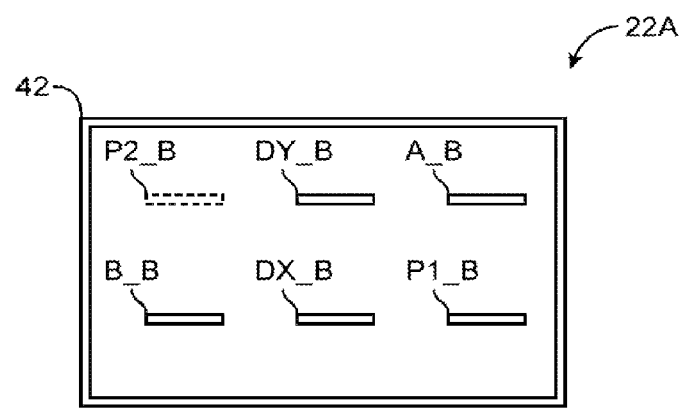
FIG. 3B is a schematic diagram of an illustrative reversible 6-pin mating connector with a second orientation in accordance with an embodiment of the present invention.

An illustrative 6-pin connector plug 22A for use with reversible connector port 20A is shown in FIGS. 3A and 3B. 6-pin connector plug 22A may contain conductive paths P1_B, Dx_B, B_B, A_B, Dy_B, and optional power supply path P2_B for coupling to a connector port 20A. To convey a ground signal between connector plug 22A and connector port 20A, connector plug 22A may contain a metal grounding shell 42 that couples to metal grounding shell 40 of connector port 20A.

Connector port 20A may receive 6-pin connector plug 22A with a first orientation shown in FIG. 3A. In the arrangement of FIG. 3A, the conductive paths of connector port 20A may be coupled to corresponding conductive paths of connector plug 22A (i.e., conductive path P1_A may be coupled to conductive path P1_B, conductive path Dx_A may be coupled to conductive path Dx_B, conductive path B_A may be coupled to conductive path B_B, conductive path A_A may be coupled to conductive path A_B, and conductive path Dy_A may be coupled to conductive path Dy_B). In this arrangement, a positive power supply voltage may be conveyed between connector port 20A and connector plug 22A via conductive paths (e.g., contacts) P1_A and P1_B, while conductive paths P2_A and P2_B may be left floating (i.e., not driven with a power supply voltage).

Connector port 20A may receive a 6-pin connector plug 22A with a second orientation shown in FIG. 3B. The second orientation may correspond to a user physically rotating connector plug 22A 180 degrees relative to the orientation of FIG. 3A (or vice versa). Inserting connector plug 22A into connector port 20A with the second orientation may be referred to as reversing connector plug 22A. In this arrangement, the conductive paths of connector port 20A may be coupled to different conductive paths of connector plug 22A relative to the first orientation. As shown in FIG. 3B, conductive path Dx_A may be coupled to conductive path Dy_B, conductive path B_A may be coupled to conductive path A_B, conductive path A_A may be coupled to conductive path B_B, conductive path Dy_A may be coupled to conductive path Dx_B, and power supply path P2_A may be coupled to power supply path P1_B, while power supply paths P1_A and P2_B may be left floating.

The conductive paths of connector port 20A may be coupled to different paths of connector plug 22A depending on the orientation of connector plug 20B. When connector plug 22A is connected with the first orientation, power supply path P1_A may be coupled to path P1_B and power supply path P2_A may be floating. When connector plug 22B is connected with the second orientation, power supply path P1_A may be floating and power supply path P2_A may be coupled to path P1_B. A connector port 20A that accommodates the first connector plug orientation and the second connector plug orientation may be referred to as a reversible connector or a connector port that supports reversible connections.

Figure 4:
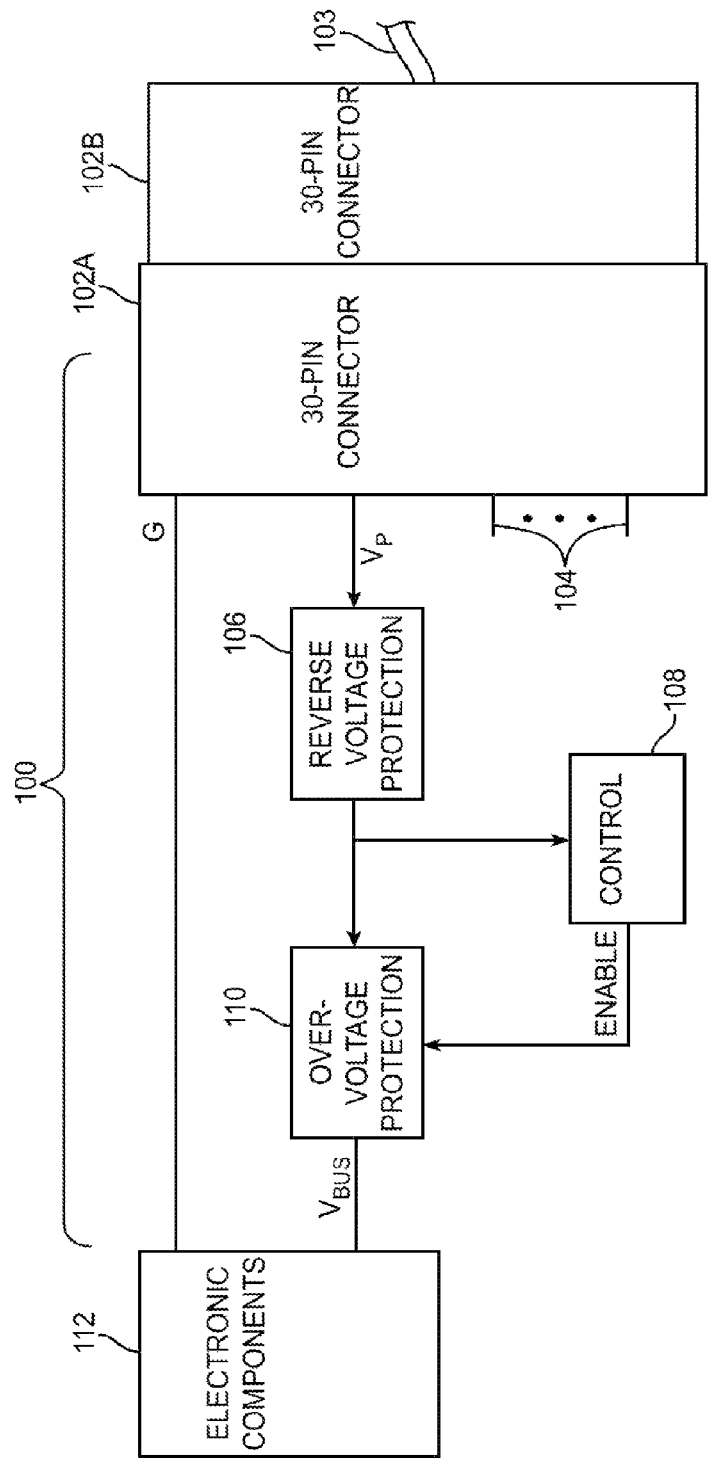
FIG. 4 is a schematic diagram of a conventional 30-pin connector port.

Conventional connector ports such as 30-pin connector ports do not support reversible connections. A conventional 30-pin connector port 100 receiving a 30-pin connector plug is shown in FIG. 4. As shown in FIG. 4, conventional 30-pin connector port 100 contains paths for receiving a ground voltage G and power supply voltage Vp from 30-pin connector plug 102. Data signals are conveyed between the 30-pin connector plug and conventional connector port 100 via paths 104. Conventional 30-pin connector port 100 contains reverse voltage protection circuitry 106, control circuitry 108, and over-voltage protection circuitry 110. Reverse voltage protection circuitry 106 provides protection against a negative voltage Vp (relative to ground) received from 30-pin connector plug 102 (i.e., reverse voltage protection circuitry 106 prevents negative voltages Vp from passing through). Control circuitry 108 detects a voltage signal at the output of reverse voltage protection circuitry 106 and drives over-voltage protection circuitry 110 with an enable signal to allow the output of reverse voltage protection circuitry 106 to pass through over-voltage protection circuitry 110. Over-voltage protection circuitry 110 protects against large voltages Vp (i.e., over-voltage protection circuitry 110 blocks large voltages Vp that could damage electronic components 112). Conventional connector port 100 conveys input power supply voltage Vp to electronic components 112 as an output power supply voltage Vbus.

Conventional 30-pin connector port 100 receives 30-pin connector plugs with a predetermined orientation. Conventional 30-pin connector ports require a power supply signal to appear at the input of reverse voltage protection circuitry 106 and data signals to appear at predetermined locations on paths 104. If a conventional 30-pin connector port 100 receives a 30-pin connector plug with an incorrect orientation, electronic components 112 can be provided with inappropriate power supply signals that damage electronic components 112. Conventional connector ports include mechanisms that physically protect against connector plugs that are inserted with incorrect orientations.

Figure 5:
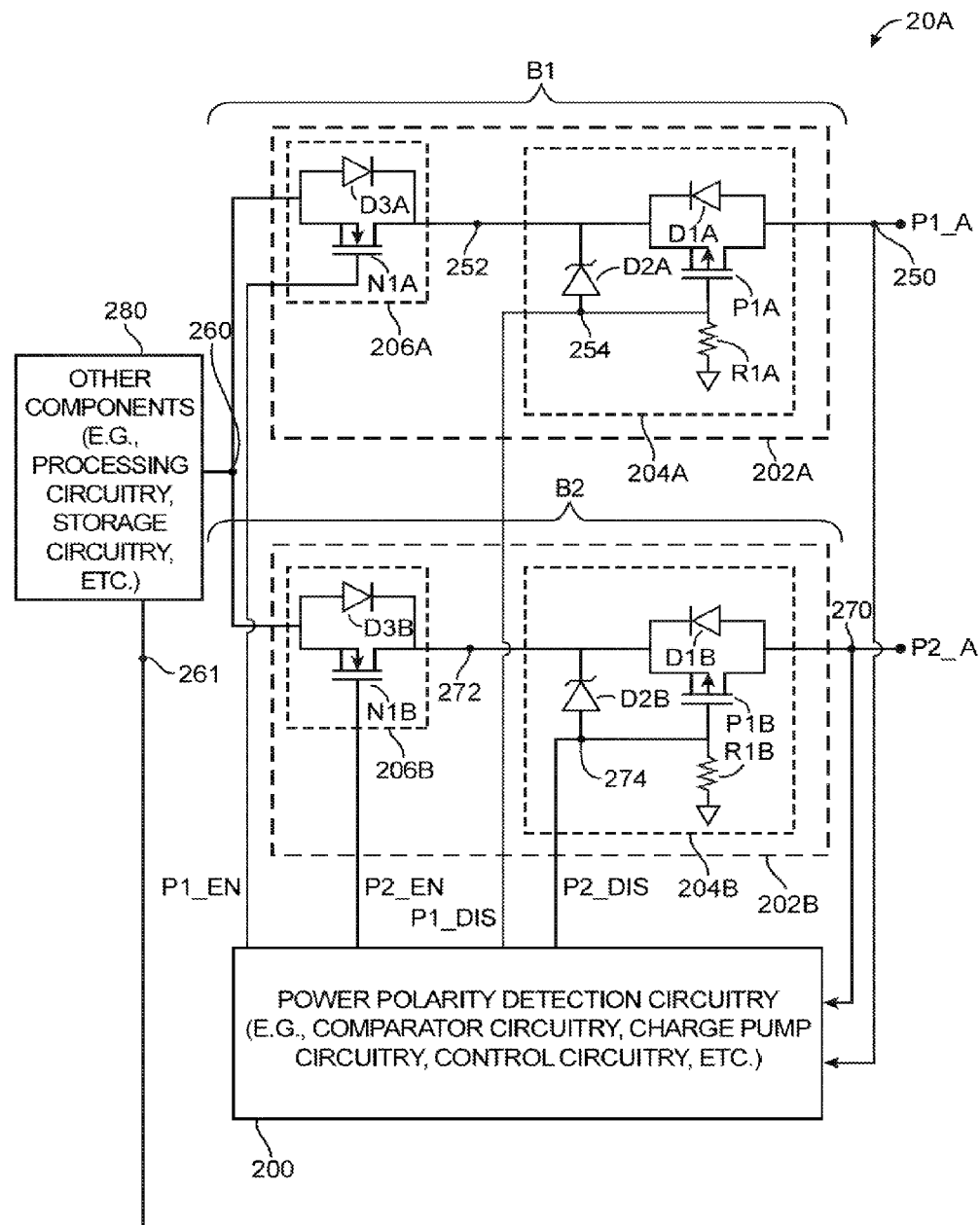
FIG. 5 is a schematic diagram of illustrative power protection circuitry that may be used in a reversible connector port.

To accommodate reversible connections, a connector port may detect the orientation of an inserted connector plug and use the detected orientation to configure connector port circuitry. In the arrangement of FIG. 5, a connector port 20A may be provided with power polarity detection circuitry 200 (sometimes referred to herein as connector orientation detection circuitry) and protection circuitry 202A and 202B to accommodate reversible connections.

Connector port 20A may include a ground power supply path 40 that provides a power supply ground voltage at ground power supply node 261 for components 280. Connector port 20A may receive a mating connector (not shown) that provides a power supply voltage relative to the ground power supply voltage provided via ground supply path 40. Ground power supply path 40 may be formed from a symmetrical grounding shell 40 that couples to a corresponding symmetrical grounding shell of the mating connector. Connector port 20A may receive a mating connector in a first orientation and a second orientation. In the first orientation, the mating connector may provide a ground voltage via path 40 and a power supply voltage via power supply path P1_A. In the second orientation, the mating connector may provide a ground voltage via path 40 and a power supply voltage via power supply path P1_B.

A first branch B1 may be formed from the circuitry associated with a power supply signal path between an input node 250 (e.g., an input power supply node) and an output node 260 (i.e., the circuitry associated with the signal path through reverse voltage protection circuitry 204A and over-voltage protection circuitry 206A).

Protection circuitry 202A may be coupled between input node 250 (e.g., an input power supply node) and output node 260 (e.g., an output power supply node). Input node 250 may be coupled to power supply path P1_A of connector port 20A. Protection circuitry 202A may contain reverse voltage protection circuitry 204A coupled between input node 250 and an intermediate node 252 (e.g., an intermediate power supply node). Protection circuitry 202A may contain over-voltage protection circuitry 206A coupled between output node 260 and intermediate node 252.

Reverse voltage protection circuitry 204A may include a diode D1A and a transistor P1A (e.g., a p-type transistor) coupled in parallel between input node 250 and intermediate node 252. Reverse voltage protection circuitry 204A may include an input control node 254 through which a control signal may be supplied to the gate of transistor P1A (e.g., a P1_DIS control signal supplied by power polarity detection circuitry 200). A diode D2A (e.g., a zener diode or other diodes with desirable reverse breakdown voltages) may be coupled between intermediate node 252 and control node 254. A resistor R1A may be coupled between control node 254 and a ground terminal.

Over-voltage protection circuitry 206A may include a diode D3A and an n-type transistor N1A coupled between output node 260 and intermediate node 252. Over-voltage protection circuitry 206A may be provided a control signal via the gate of transistor N1A (e.g., a P1_EN control signal may be provided to the gate of transistor N1A by power polarity detection circuitry 200).

A second branch B2 may be formed from the circuitry associated with a signal path between an input node 270 (e.g., an input power supply node) and output node 260 (i.e., the circuitry associated with a signal path through reverse voltage protection circuitry 204B and over-voltage protection circuitry 206B).

Protection circuitry 202B may be coupled between input node 270 and output node 260. Input node 270 may be coupled to power supply path P2_A of connector port 20A. Protection circuitry 202B may contain reverse voltage protection circuitry 204B coupled between input node 270 and an intermediate node 272. Protection circuitry 202B may contain over-voltage protection circuitry 206B coupled between output node 260 and intermediate node 272 (e.g., an intermediate power supply node).

Reverse voltage protection circuitry 204B may include a diode D1B and a transistor P1B (e.g., a p-type transistor) coupled in parallel between input node 270 and intermediate node 272. Reverse voltage protection circuitry 204B may include an input control node 274 through which a control signal may be supplied to the gate of transistor P1B (e.g., a P2_DIS control signal supplied by power polarity detection circuitry 200). A diode D2B (e.g., a zener diode) may be coupled between intermediate node 272 and control node 274. A resistor R1B may be coupled between control node 274 and a ground terminal.

Over-voltage protection circuitry 206B may include a diode D3B and an n-type transistor N1B coupled between output node 260 and intermediate node 272. Over-voltage protection circuitry 206B may be provided a control signal via the gate of transistor N1B (e.g., a P2_EN control signal may be provided to the gate of transistor N1B by power polarity detection circuitry 200).

The first and second branches may provide paths through which a power supply voltage may be conveyed from ports P1_A or P2_A to other components 280 coupled to output node 260 (e.g., components such as processing circuitry, storage circuitry, communications circuitry, or other components of electronic device 10). For normal operation, components 280 may require power supply voltages that are within a predetermined range (e.g., power supply voltages between 4.25 V and 6 V). Reverse voltage protection circuitry 204 and over-voltage protection circuitry 206 may provide protection against power supply voltages that are outside of the predetermined range of voltages.

Reverse voltage protection circuitry 204 of each branch may provide protection against voltages that are negative. For example, the gate of p-type transistor P1A may be tied to ground through resistor R1A to prevent current flow through transistor P1A when the voltage at input node 250 is less than zero (i.e., the source-gate voltage may be insufficient to activate transistor P1A). At negative input voltages, diode D1A may be reverse-biased and prevent current flow between input node 250 and intermediate node 252.

Over-voltage protection circuitry 206 of each branch may provide protection against power supply voltages that are larger than the predetermined voltage range. For example, if a large input voltage (e.g., a voltage larger than the predetermined voltage range) is supplied to input node 250 via power supply path P1_A, diode D1A may be forward-biased and convey the input voltage from input node 250 to intermediate node 252. Over-voltage protection circuitry 206A may prevent the large input voltage from being conveyed to output node 260. To prevent the large input voltage from being conveyed to output node 260, the gate of transistor N1A may be supplied with an appropriate voltage (e.g., 0 V) that prevents current from flowing between intermediate node 252 and output node 260 (i.e., the gate of n-type transistor N1A may be supplied with a voltage of 0 V so that the gate-source voltage is insufficient to activate transistor N1A).

Control signals may be provided by power protection circuitry 200 to over-voltage protection circuitry 206 to protect against power supply voltages that are between zero and the lower end of the predetermined voltage range (e.g., to protect against power supply voltages that are insufficient to properly power components 280). At these voltages, diode D3A may be reverse-biased and the current flow between intermediate node 252 and output node 260 may be determined by n-type transistor N1A (e.g., diode D3A may be reverse-biased by an input voltage of 2 V supplied by power supply path P1_A). To prevent current flow at these voltages, the gate of transistor N1A may be supplied with an appropriate voltage (e.g., 0 V) so that the gate-source voltage of transistor N1A is insufficient to activate transistor N1A.

It may be desirable to have different threshold voltages for activation of transistor N1A and deactivation of transistor N1A. For example, it may be desirable to provide a control signal to the gate of transistor N1A that activates transistor N1A when the power supply voltage is greater than 4.25 V and deactivates transistor N1A when the power supply voltage is less than 2.8 V.

Zener diodes D2A and D2B may protect respective transistors P1A and P1B from large input voltages. For example, if the power supply voltage at input P1_A is greater than the predetermined voltage range, the source-gate voltage of p-type transistor P1A may be determined by the reverse breakdown voltage of zener diode D2A. The use of zener diode D2A may protect transistor P1A by limiting the maximum voltage drop across the source terminal of transistor P1A and the gate terminal of transistor P1A.

The principles by which protection circuitry 202A of branch B1 are operated are applicable to protection circuitry 202B of branch B2. It should be understood that protection circuitry 202B may be operated in the same manner as protection circuitry 202A to provide voltage protection in the case that a power supply voltage is provided to input node 270 (e.g., in the case that a connector plug 22A is connected with a reversed orientation and power supply path P1_B is coupled to power supply path P2_A instead of power supply path P1_A).

Control signals may be provided to over-voltage protection circuitry and reverse voltage protection circuitry by power polarity detection circuitry 200. Power polarity detection circuitry 200 may provide output control signals P1_EN to the gate of transistor N1A of branch 1, P1_DIS to control node 254 of branch 1, P2_EN to the gate of transistor N1B of branch 2, and P2_DIS to control node 274 of branch 2. Power polarity detection circuitry 200 may have inputs that are coupled to power supply paths P1_A and P2_A.

When no accessory device 30 is connected to electronic device 10 (e.g., when no connector plug 22A is coupled to connector port 20A), power polarity detection circuitry 200 may set the P1_EN and P2_EN control signals to a ground voltage and the P1_DIS and P2_DIS control signals to high impedance (HiZ). By setting the P1_EN and P2_EN control signals to the ground voltage, transistor N1A of branch 1 and transistor N1B of branch 2 may be disabled. By setting the P1_DIS and P2_DIS control signals to high impedance (e.g., by disconnecting the P1_DIS and P2_DIS control signals), the gate voltage of transistor P1A may be determined by the breakdown voltage of zener diode D2A (at high input voltages) and grounding resistor R1A and the gate voltage of transistor P1B may be determined by the breakdown voltage of zener diode D2B and grounding resistor R1B.

Figure 6:
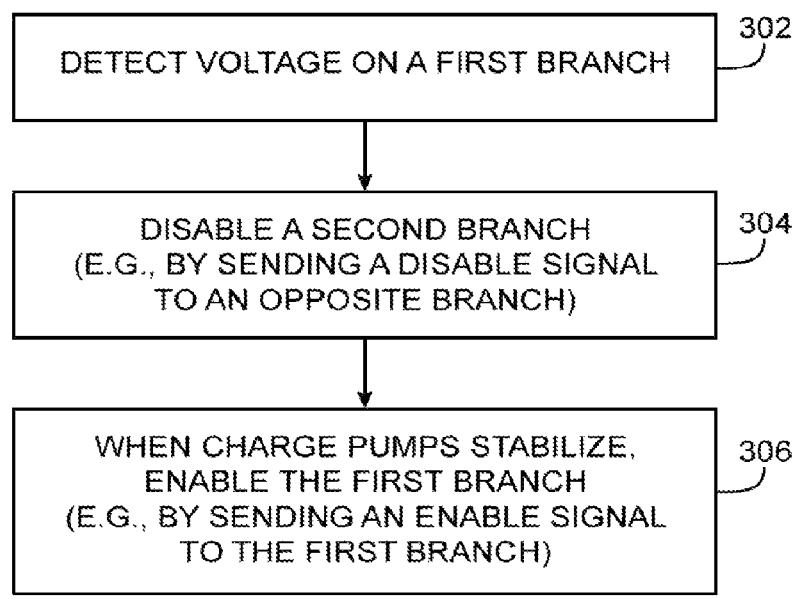
FIG. 6 is a flow chart of illustrative steps that may be performed by power polarity detection circuitry to configure power protection circuitry to accommodate a reversible connector.

When an accessory device 30 that supplies a valid power supply voltage (e.g., a power supply voltage within the normal operating voltage range of device 10) is connected to electronic device 10, power polarity detection circuitry 200 may perform the steps of the flowchart shown in FIG. 6.

In step 302, power polarity detection circuitry 200 may detect a power supply voltage on a first branch. For example, power polarity detection circuitry 200 may use comparator circuitry to determine if a power supply voltage is being provided on path P1_A to branch B1 or if a power supply voltage is being provided on path P2_A to branch B2.

In step 304, power polarity detection circuitry may drive a disable signal to the opposite branch in response to detecting a power supply voltage for the first branch. For example, if a power supply voltage with voltage 5 V is detected on path P1_A, power polarity detection circuitry may provide a P2_DIS control signal with voltage 5 V to input node 274. By supplying input node 274 with a 5 V control signal, transistor P1B may be deactivated (i.e., the source-gate voltage of transistor P1B may be less than the activation voltage threshold of transistor P1B).

In response to detecting a power supply voltage for a branch, power polarity detection circuitry 200 may activate charge pump circuitry. The charge pump circuitry may provide a boosted voltage relative to the detected power supply voltage that may be used to drive the input gate of transistor N1A or transistor N1B. For example, if a 5 V power supply voltage was detected at the input to branch B1 in step 302, then the charge pump circuitry may provide a boosted voltage that is equal to the 5 V input power supply voltage plus the activation threshold voltage of transistor N1B (e.g., 6 V).

The charge pump circuitry may require time to stabilize (i.e., it may take time to stabilize the boosted voltage produced by the charge pump circuitry). In step 306, after the charge pump circuitry output is stabilized, the first branch may be enabled (e.g., by sending a P1_EN) to allow the power supply voltage to be conveyed to other components of electronic device 10. For example, if a power supply voltage within a predetermined operating range was detected at the input to branch B1 in step 302, then diode D1A and transistor P1A may convey the power supply voltage to intermediate node 252. After the charge pump circuitry is stabilized, transistor N1A may be activated by the boosted voltage and the power supply voltage may be conveyed from intermediate node 252 to output node 260.

By disabling the opposite branch in step 304, protection may be provided against undesired current flow through the opposite branch. For example, when an output voltage is conveyed through a first branch (e.g., branch B1) to output node 260, the output voltage may be conveyed to intermediate node 272 of the opposite branch (i.e., a positive power supply voltage at output node 260 may forward bias diode D3B and be conveyed to intermediate node 272 of branch B2 through diode D3B). Disabled transistor P1B may prevent undesired current flow from the intermediate node to input node 270.

The foregoing is merely illustrative of the principles of this invention and various modifications can be made by those skilled in the art without departing from the scope and spirit of the invention.

What is claimed is:

1. An electronic device comprising:
   a plurality of switches coupled between electrical components and first and second contacts in a first connector, wherein the first connector is configured to mate with a second connector having third and fourth contacts in a first orientation in which the first contact is coupled to the third contact and the second contact is connected to the fourth contact and a second orientation in which the first contact is coupled to the fourth contact and the second contact is connected to the third contact, the plurality of switches comprising:
a first switch coupled between the first contact and the electrical components;
a second switch coupled between the second contact and the electrical components; and
connector orientation detection circuitry coupled to the first and second connector contacts,
wherein the connector orientation detection circuitry provides control signals to the first and second switches so that the first switch and the second state are each either in a first state or a second state in response to the detection of the first orientation or the second orientation, and
wherein the first switch is open in response to detection of the first orientation and the first switch is closed in response to detection of the second orientation, and the second switch is closed in response to the detection of the first orientation and the second switch is open in response to the detection of the second orientation.

2. The electronic device of claim 1 wherein the first switch is in a first state in response to detection of the first orientation and the first switch is in a second state in response to detection of the second orientation, and the second switch is in a second state in response to the detection of the first orientation and the second switch is in a first state in response to the detection of the second orientation.

3. The electronic device of claim 1 wherein the first switch and the second switch each comprises MOSFET transistors.

4. The electronic device of claim 1 wherein the first switch and the second switch are coupled to the connector orientation detection circuitry.

5. An electronic device including switching circuitry coupled between a connector in the electronic device and internal device components in the electronic device, wherein the connector has at least first and second contacts, and wherein the connector is configured to mate with a mating connector having third and fourth contacts in a first orientation in which the first contact is connected to the third contact and the second contact is connected to the fourth contact, and a second orientation in which the first contact is connected to the fourth contact and the second contact is connected to the third contact, the electronic device further comprising:
a power node configured to supply power to the internal device components;
a first switching circuit branch coupled between the power node and the first contact;
a second switching circuit branch coupled between the power node and the second contact; and
connector orientation detection circuitry coupled to the first and second contacts and configured to detect whether the mating connector has the first orientation or the second orientation, wherein the connector orientation detection circuitry provides control signals to the first and second switches,
wherein the first switching circuit is open in response to detection of the first orientation and the first switching circuit is closed in response to detection of the second orientation, and the second switching circuit is closed in response to the detection of the first orientation and the second switching circuit is open in response to the detection of the second orientation.

6. The electronic device of claim 5 wherein the first switching circuit is in a first state in response to detection of the first orientation and the first switching circuit is in a second state in response to detection of the second orientation, and the second switching circuit is in a second state in response to the detection of the first orientation and the second switching circuit is in a first state in response to the detection of the second orientation.

7. The electronic device of claim 5 wherein the first switching circuit and the second switching circuit each comprises MOSFET transistors.

8. The electronic device of claim 5 wherein the first switching circuit branch and the second switching circuit branch are coupled to the connector orientation detection circuitry.

9. An electronic device comprising:
a first connector having first and second contacts, wherein the first connector is configured to mate with a second connector having third and fourth contacts in a first orientation in which the first contact is coupled to the third contact and the second contact is connected to the fourth contact and a second orientation in which the first contact is coupled to the fourth contact and the second contact is connected to the third contact,
a first switch coupled to the first connector;
a second switch coupled to the first connector; and
connector orientation detection circuitry coupled to the first and second contacts and configured to detect whether the mating connector has the first orientation or the second orientation, wherein the connector orientation detection circuitry provides control signals to the first and second switches,
wherein the first switching circuit is open in response to detection of the first orientation and the first switching circuit is closed in response to detection of the second orientation, and the second switching circuit is closed in response to the detection of the first orientation and the second switching circuit is open in response to the detection of the second orientation.

10. The electronic device of claim 9 wherein the first switch and the second switch are coupled to the connector orientation detection circuitry.

11. The electronic device of claim 9 wherein the first switch is coupled to the first contact and the second switch is coupled to the second contact.

12. An electronic device comprising:
a first connector having first and second contacts, wherein the first connector is configured to mate with a second connector having third and fourth contacts in a first orientation in which the first contact is coupled to the third contact and the second contact is connected to the fourth contact and a second orientation in which the first contact is coupled to the fourth contact and the second contact is connected to the third contact,
a first switch coupled to the first contact;
a second switch coupled to the second contact; and
connector orientation detection circuitry coupled to the first connector and configured to detect whether the mating connector has the first orientation or the second orientation, wherein the connector orientation detection circuitry provides control signals to the first and second switches, and
wherein the first switch is open in response to detection of the first orientation and the first switch is closed in response to detection of the second orientation, and the second switch is closed in response to the detection of the first orientation and the second switch is open in response to the detection of the second orientation.

13. The electronic device of claim 12 wherein the connector orientation detection circuit is coupled to the first contact and the second contact.

14. The electronic device of claim 12 wherein the first switch and the second switch are coupled to the connector orientation detection circuitry.

15. An electronic device comprising:
- a first connector having a first contact and a second contact;
- a plurality of electrical components;
- a plurality of switches coupled between the electrical components and the first and second contacts in the first connector, the plurality of switches comprising:
  - a first switch coupled between the first contact and the electrical components;
  - a second switch coupled between the second contact and the electrical components; and
- connector orientation detection circuitry coupled to the first and second connector contacts,
- wherein the connector orientation detection circuitry provides control signals to the first and second switches so that the first switch and the second state are each either in a first state or a second state in response to the detection of the first orientation or the second orientation, and
- wherein the first switch is open in response to detection of the first orientation and the first switch is closed in response to detection of the second orientation, and the second switch is closed in response to the detection of the first orientation and the second switch is open in response to the detection of the second orientation.

16. The electronic device of claim 15 wherein the first switch and the second switch are coupled to the connector orientation detection circuitry.

17. The electronic device of claim 15 wherein the first switch is in a first state in response to detection of the first orientation and the first switch is in a second state in response to detection of the second orientation, and the second switch is in a second state in response to the detection of the first orientation and the second switch is in a first state in response to the detection of the second orientation.

* * * * *